US012525200B2

(12) United States Patent
Kim et al.

(10) Patent No.: US 12,525,200 B2
(45) Date of Patent: Jan. 13, 2026

(54) BACKLIGHT DEVICE FOR DISPLAY AND CURRENT CONTROL INTEGRATED CIRCUIT THEREOF

(71) Applicant: Global Technologies Co., Ltd., Hwaseong-si (KR)

(72) Inventors: Yong Geun Kim, Suwon-si (KR); Min Seon Kim, Hwaseong-si (KR)

(73) Assignee: GLOBAL TECHNOLOGIES CO., LTD., Hwaseong-si (KR)

( * ) Notice: Subject to any disclaimer, the term of this patent is extended or adjusted under 35 U.S.C. 154(b) by 0 days.

(21) Appl. No.: 18/843,184

(22) PCT Filed: Jan. 27, 2023

(86) PCT No.: PCT/KR2023/001280
§ 371 (c)(1),
(2) Date: Aug. 30, 2024

(87) PCT Pub. No.: WO2023/167427
PCT Pub. Date: Sep. 7, 2023

(65) Prior Publication Data

US 2025/0191546 A1 Jun. 12, 2025

(30) Foreign Application Priority Data

Mar. 3, 2022 (KR) ........................ 10-2022-0027517

(51) Int. Cl.
*G09G 3/34* (2006.01)

(52) U.S. Cl.
CPC ... *G09G 3/3426* (2013.01); *G09G 2320/0233* (2013.01); *G09G 2320/0247* (2013.01); *G09G 2320/064* (2013.01)

(58) Field of Classification Search
CPC .......... G09G 3/3406–3426; G09G 2320/0233; G09G 2320/0247; G09G 2320/064
See application file for complete search history.

(56) References Cited

U.S. PATENT DOCUMENTS 10,447,988 B2 * 10/2019 Lee ........................ G09G 3/342
10,810,952 B2 * 10/2020 Lim ..................... G09G 3/3611
(Continued)

FOREIGN PATENT DOCUMENTS

JP 2010-250208 11/2010
KR 10-0902548 6/2009
(Continued)

OTHER PUBLICATIONS

International Search Report with English translation for International Application No. PCT/KR2023/001280, dated May 1, 2023.
(Continued)

*Primary Examiner* — Gene W Lee
(74) *Attorney, Agent, or Firm* — KILE PARK REED & HOUTTEMAN PLLC

(57) ABSTRACT

Disclosed are a backlight device for a display that provides a backlight for displaying an image and a current control integrated circuit thereof. According to the backlight device and the current control integrated circuit thereof, a driving current can be controlled so as to allow light emitting blocks to maintain light emission for one frame or more, and the luminance of a backlight can be uniformly and precisely controlled in an entire luminance change area.

13 Claims, 12 Drawing Sheets

(56) References Cited

U.S. PATENT DOCUMENTS

| | | | | |
|---|---|---|---|---|
| 11,557,259 | B2 * | 1/2023 | Kim | H05B 45/46 |
| 2021/0398498 | A1 * | 12/2021 | Kim | G09G 5/10 |
| 2021/0398499 | A1 * | 12/2021 | Kim | G09G 3/36 |

FOREIGN PATENT DOCUMENTS

| | | |
|---|---|---|
| KR | 10-2011-0077106 | 7/2011 |
| KR | 10-2019-0137658 | 12/2019 |
| KR | 10-2271828 | 7/2021 |

OTHER PUBLICATIONS

Written Opinion with English translation for International Application No. PCT/KR2023/001280, dated May 1, 2023.

* cited by examiner

BACKLIGHT DEVICE FOR DISPLAY AND CURRENT CONTROL INTEGRATED CIRCUIT THEREOF

BACKGROUND

1. Field

Exemplary embodiments relate to a backlight device for a display, and more particularly, to a backlight device for a display that provides a backlight for displaying an image and a current control integrated circuit thereof.

2. Discussion of the Related Art

Among display panels, for example, an LCD panel requires a backlight device to display images.

The backlight device is intended to provide a backlight for displaying images on an LCD panel, and the LCD panel may display images by using the backlight by performing an optical shutter operation for each pixel.

The backlight device may include a backlight board coupled to the LCD panel. The backlight board may include light emitting blocks using LEDs as light sources, and the light emitting blocks may emit light to provide a backlight.

The backlight board may include light emitting blocks to provide a backlight with a resolution different from that of the image of the LCD panel, and each light emitting block may be configured so that its dimming is controlled.

A backlight device in the related art that performs dimming control has a difficulty in maintaining light emission of light emitting blocks for one frame. When the light emitting blocks do not sufficiently maintain light emission for one frame, a flicker may occur in the backlight. Therefore, the backlight device needs to adopt a design for reducing or eliminating the flicker.

The backlight device also needs to be configured to precisely control the luminance of the backlight over an entire luminance change area. That is, the luminance change needs to be uniformly controlled in a low luminance area where light is emitted using a small amount of current and a high luminance area where light is emitted using a large amount of current.

SUMMARY

Various embodiments are directed to providing a backlight device for a display and a current control integrated circuit thereof that can reduce or eliminate a flicker in a backlight provided to an LCD panel for a display by allowing light emitting blocks to maintain light emission for one frame or more.

Various embodiments are directed to providing a backlight device for a display and a current control integrated circuit thereof that can uniformly and precisely control the luminance of a backlight over an entire luminance change area.

Various embodiments are directed to providing a backlight device and a current control integrated circuit thereof that can uniformly control the luminance over an entire luminance change area by controlling the amount of driving current for a backlight through a combination of linear control and pulse width control.

A backlight device for a display of the present disclosure may include: a backlight driving board configured to generate frame-unit backlight data for a backlight and to provide, for each horizontal period, a column signal including a first column pulse and a second column pulse having a level corresponding to column data of the backlight data and a row signal including a first row pulse having a first enable timing corresponding to the first column pulse and a second row pulse having a second enable timing corresponding to the second column pulse; and a backlight board configured to provide the backlight by the column signal and the row signal provided for each horizontal period, wherein the backlight board includes: light emitting blocks configured to form columns and rows and to be grouped into a plurality of control units each including a plurality of rows; and current control integrated circuits configured for each control unit and each including a plurality of driving current control units configured to receive the column signal shared by the light emitting blocks of a same column and the row signals corresponding to the plurality of rows, respectively, and the driving current control unit generates a first sampled signal by sampling the first column pulse by using the first row pulse, generates a second sampled signal by sampling the second column pulse by using the second row pulse, and controls an amount of driving current for light emission of the light emitting block to correspond to a pulse width corresponding to a level of the first sampled signal and a level of the second sampled signal.

A current control integrated circuit of a backlight device for a display of the present disclosure may include: a plurality of driving current control units configured to correspond to light emitting blocks in control units each including a plurality of rows, to share a column signal including a first column pulse and a second column pulse with respect to a same column, and to receive different row signals each including a first row pulse and a second row pulse, wherein each of the driving current control units generates a first sampled signal by sampling the first column pulse by using the first row pulse having a first enable timing corresponding to the first column pulse, generates a second sampled signal by sampling the second column pulse by using the second row pulse having a second enable timing corresponding to the second column pulse, and controls an amount of driving current for light emission of the light emitting block to correspond to a pulse width corresponding to a level of the first sampled signal and a level of the second sampled signal.

The present disclosure can be expected to have the effect that light emitting blocks for providing a backlight to a display panel for a display can maintain light emission for one frame or more and provide a backlight with a reduced or eliminated flicker.

The present disclosure can also be expected to have the effect that the luminance of a backlight provided in a panel for a display can be uniformly and precisely controlled in an entire luminance change area.

The present disclosure can also be expected to have the effect that the luminance of an entire luminance change area can be uniformly controlled by controlling the amount of driving current for a backlight through a combination of linear control and pulse width control.

DETAILED DESCRIPTION

Figure 1:
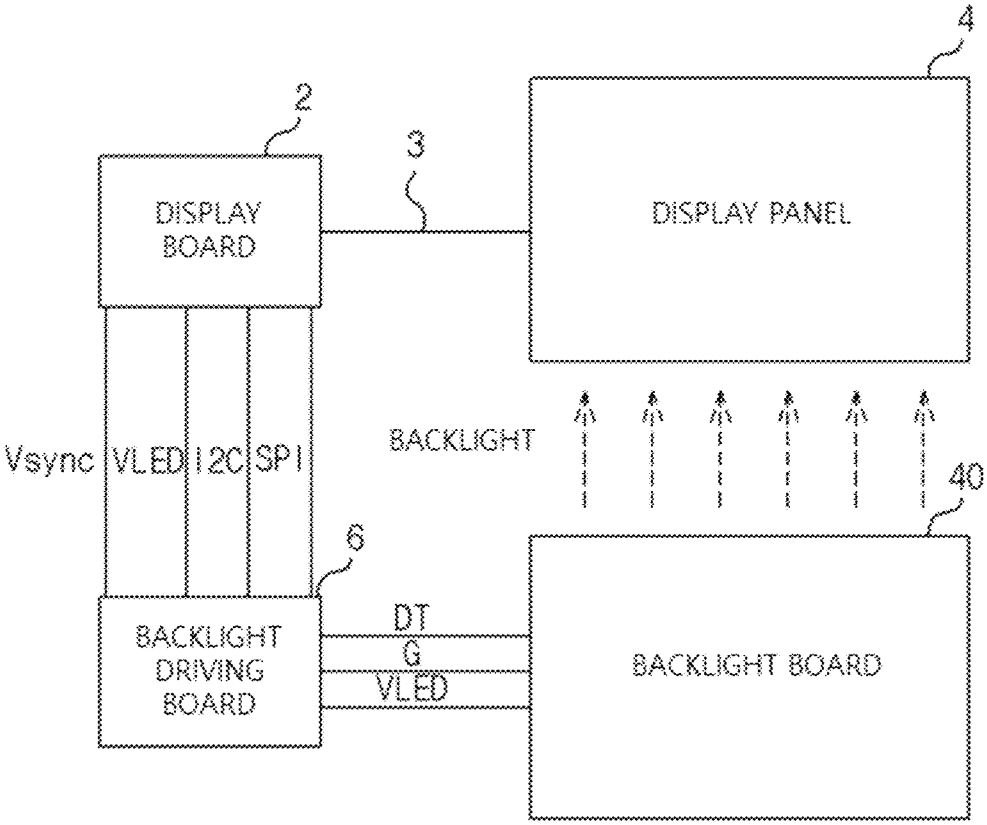
FIG. 1 is a block diagram illustrating an embodiment of a backlight device for a display of the present disclosure.

Hereinafter, preferred embodiments of the present disclosure are described in detail with reference to the accompanying drawings. The terms used in this specification and claims are not interpreted as being limited to typical or dictionary definitions, but should be interpreted as meanings and concepts which coincide with the technical idea of the present disclosure.

Since an embodiment described in the present specification and configurations illustrated in the drawings are preferred embodiments of the prevent disclosure and do not represent all the technical scopes of the prevent disclosure, there may be various equivalents and modification examples which can substitute for them at the time of application of the prevent disclosure.

A display device for displaying an image may be illustrated as including a display board 2, a display panel 4, a backlight driving board 6, and a backlight board 40 as illustrated in FIG. 1.

In the above configuration, it can be understood that the backlight driving board 6 and the backlight board 40 correspond to a backlight device.

The backlight device is used to provide a backlight for displaying images on the display panel 4. The backlight is configured to be provided from the backlight board 40 to the display panel 4. The backlight board 40 may include light emitting blocks for providing a backlight and current control integrated circuits.

The configuration and function of the display device for displaying an image are described below with reference to FIG. 1.

In order to display an image, the display board 2 and the display panel 4 may be used.

The display panel 4 may be configured using an LCD panel, and is configured to receive display data from the display board 2 through a transmission line 3 and to display an image in response to the display data.

The display panel 4 includes pixels (not illustrated) for implementing a pre-designed resolution, and each pixel performs an optical shutter operation in response to the display data. The display panel 4 may display an image using a backlight by the above-described optical shutter operation of the pixels.

The display board 2 is configured to receive data from a video source (not illustrated), generate display data for displaying an image by using the received data, and provide the display data to the display panel 4 through the transmission line 3.

For the transmission of the display data described above, the display board 2 may include components (not illustrated) for configuring display data into packets and components for providing the display data including the packets to the display panel 4. Since the components for configuring the display data into the packets correspond to timing controllers used in general display devices, a description thereof is omitted.

The display data may be configured to display images in units of frames. For example, the display data may include data indicating the brightness of a pixel, a vertical synchronization signal Vsync that divides frames according to a frame period, a horizontal synchronization signal that divides the horizontal periods of the frame, and the like.

The configuration and function of the backlight device for providing a backlight to the display panel 4 are described below with reference to FIG. 1.

The display board 2 may provide luminance data SPI corresponding to frame-unit display data to the backlight driving board 6.

The resolution of an image displayed on the display panel 4 and the resolution of the backlight provided to the display panel 4 from the backlight board 40 may be different from each other. The gray range and gray value of the backlight may also be different from those for images.

Therefore, the display board 2 may be configured to provide luminance data SPI converted to be suitable for the resolution, the gray range, and the gray value of the backlight by using the display data. To this end, the display board 2 can be understood as including a conversion circuit (not illustrated) for converting the display data into the luminance data SPI.

The display board 2 may configure the luminance data SPI in a format that can be received by the backlight driving board 6, and provide the luminance data SPI to the backlight driving board 6.

The display board 2 may provide a dimming mode command I2C to the backlight driving board 6 in order to set a dimming mode for the backlight corresponding to a displayed image. For example, the dimming mode command I2C may include information defining a dimming mode as one of linear control, pulse width control, and composite control.

The linear control can be understood as controlling the amount of driving current for the backlight by using a control signal having a level corresponding to a change in luminance, and the pulse width control can be understood as controlling the amount of driving current for the backlight by using a control pulse having a pulse width corresponding to a change in luminance. The composite control is a combination of the linear control and the pulse width control, and can be understood as controlling the amount of driving current for the backlight by complexly using the control signal having a level corresponding to a change in luminance and the control pulse having a pulse width corresponding to a change in luminance.

The display board 2 may provide the vertical synchronization signal Vsync to the backlight driving board 6 through a separate transmission line.

The display board 2 may provide a driving voltage VLED for driving the backlight to the backlight driving board 6. The driving voltage VLED can be understood as a voltage to be provided to light emitting blocks to be described below.

The backlight driving board 6 receives the luminance data SPI, the vertical synchronization signal Vsync, the dimming mode command I2C, and the driving voltage VLED from the display board 2.

The backlight driving board 6 may be configured to generate frame-unit backlight data for the backlight by using frame-unit luminance data SPI corresponding to the display data, and provide, for each horizontal period, a column signal DT and a row signal G corresponding to the backlight data. The horizontal period-by-horizontal period column signal DT may include a first column pulse D1 and a second column pulse T1 provided sequentially. At least one of the first column pulse D1 and the second column pulse T1 may have a level corresponding to the horizontal period-by-horizontal period column data of the backlight data. The first column pulse D1 may have a level for the linear control and the second column pulse T1 may have a level for the pulse width control. The row signal G may include a first row pulse G11 and a second row pulse G12 provided sequentially. Out of these, the first row pulse G11 may have a first enable timing corresponding to the first column pulse D1 and the second row pulse G12 may have a second enable timing corresponding to the second column pulse T1.

The above-described column signal DT, first column pulse D1, second column pulse T1, row signal G, first row pulse G11, and second row pulse G12 are described later with reference to FIG. 3.

As described above, the backlight driving board 6 may output, for each horizontal period, the column signal DT including the first column pulse D1 having a level for the linear control and the second column pulse T1 having a level for the pulse width control.

The backlight driving board 6 may transmit the driving voltage VLED received from the display board 2 to the backlight board 40.

As described above, the backlight driving board 6 may output the column signal DT, the row signal G, and the driving voltage VLED to the backlight board 40.

Figure 2:
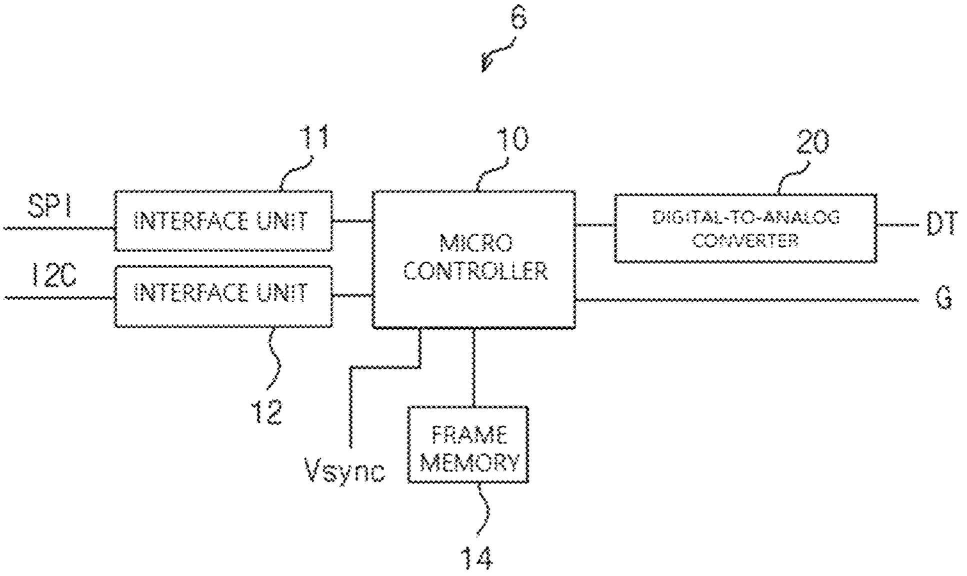
FIG. 2 is a block diagram illustrating an embodiment of a backlight driving board in FIG. 1.

The above-described backlight driving board 6 may be described with reference to FIG. 2.

The backlight driving board 6 may include a microcontroller 10, interface units 11 and 12, a frame memory 14, and a digital-to-analog converter 20.

The interface unit 11 is configured to receive the luminance data SPI and provide the luminance data SPI to the microcontroller 10. The interface unit 12 is configured to receive the dimming operation mode command I2C and provide the dimming operation mode command I2C to the microcontroller 10. The interface units 11 and 12 can be understood as serving as a buffer for the transmission of digital signals.

The microcontroller 10 is configured to receive the frame-unit luminance data SPI corresponding to the display data, the dimming operation mode command I2C, and the vertical synchronization signal Vsync, to generate the frame-unit backlight data for the backlight by using the luminance data SPI, to output, for each horizontal period of the frame, the row signal G including the first row pulse G11 and the second row pulse G12, and to output first column data and second column data corresponding to the horizontal period-by-horizontal period column data of the backlight data. The microcontroller 10 may distinguish the luminance data SPI in units of frames by using the vertical synchronization signal Vsync, distinguish horizontal periods included in the frame by synchronization using the vertical synchronization signal Vsync, and output a horizontal period-by-horizontal period row signal G.

The row signal G may sequentially include the first row pulse G11 having a first enable timing corresponding to the first column pulse D1 and the second row pulse G12 having a second enable timing corresponding to the second column pulse T1, and may be provided for each horizontal period.

Each of the first row pulse G11 and the second row pulse G12 described above can be understood with reference to FIG. 3 and can be understood as a pulse having a preset pulse width and amplitude.

That is, the microcontroller 10 may divide the horizontal period using the vertical synchronization signal Vsync, and sequentially provide the first row pulse G11 and the second row pulse G12 with a preset time difference with respect to the same horizontal period.

From the above, the synchronization using the vertical synchronization signal Vsync may be implemented in various ways, such as counting or delay synchronized with the vertical synchronization signal Vsync, and may be performed in various ways by those who understand the technology of the present disclosure. Therefore, examples and descriptions of specific embodiments thereof are omitted.

The microcontroller 10 may output the first column data and the second column data corresponding to the horizontal period-by-horizontal period column data of the backlight data.

The microcontroller 10 may provide the digital-to-analog converter 20 with the horizontal period-by-horizontal period first column data and second column data generated as described above.

The digital-to-analog converter 20 may be configured to receive the horizontal period-by-horizontal period first column data and second column data, and output, to the backlight board 40, the column signal DT sequentially including the first column pulse D1 corresponding to a value of the first column data and having a level for the linear control and the second column pulse T1 corresponding to a value of the second column data and having a level for the pulse width control.

The microcontroller 10 receives the dimming mode command I2C defining one of the linear control, the pulse width control, and the composite control.

In response to the dimming mode command I2C, the microcontroller 10 may provide the first column data corresponding to the horizontal period-by-horizontal period column data of the backlight data and the second column data having a preset value for the purpose of the linear control, provide the first column data having a preset value and the second column data corresponding to the horizontal period-by-horizontal period column data of the backlight data for the purpose of the pulse width control, and provide the first column data and the second column data corresponding to the horizontal period-by-horizontal period column data of the backlight data for the purpose of the composite control.

The digital-to-analog converter 20 may sequentially output the first column pulse D1 and the second column pulse T1 in response to the horizontal period-by-horizontal period first column data and second column data.

More specifically, in the case of the linear control, the digital-to-analog converter 20 may sequentially output, as the column signal DT, the first column pulse D1 having a level corresponding to the value of the first column data for the linear control and the second column pulse T1 having a fixed level corresponding to a preset value of the second column data. In the case of the pulse width control, the digital-to-analog converter 20 may sequentially output, as the column signal DT, the first column pulse D1 having a fixed level corresponding to a preset fixed value of the first column data and the second column pulse T1 having a level corresponding to a value of the second column data for the pulse width control. In the case of the composite control, the digital-to-analog converter 20 may sequentially output, as the column signal DT, the first column pulse D1 having a level corresponding to the value of the first column data for the linear control and the second column pulse T1 having a level corresponding to a value of the second column data for the pulse width control.

The backlight driving board 6 may include a memory 14. The microcontroller 10 may store the backlight data for one frame in the memory 14, read the backlight data of the memory 14 in units of horizontal periods, and provide the first column data and the second column data.

Figure 3:
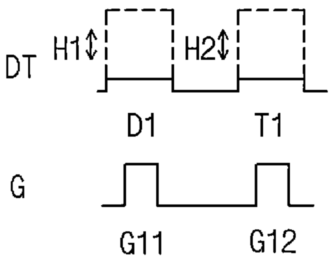
FIG. 3 is a waveform diagram illustrating a column signal and a row signal in FIG. 1.

The column signal DT and the row signal G output from the digital-to-analog converter 20 can be understood with reference to FIG. 3.

Referring to FIG. 3, the column signal DT may include the first column pulse D1 and the second column pulse T1 that are sequential.

The first column pulse D1 can be understood as a pulse having a uniform pulse width and may have a level for the linear control in response to the value of the first column data. For example, in response to the first column data with high luminance, the first column pulse D1 may have a high level of amplitude H1. On the other hand, in response to the first column data with low luminance, the first column pulse D1 may have a low level of amplitude H1. That is, the level of the first column pulse D1 may vary depending on the value of the first column data.

The second column pulse T1 may also be understood as a pulse having a uniform pulse width and may have a level for the pulse width control in response to the value of the second column data. For example, in response to the second column data with high luminance, the second column pulse T1 may have a high level of amplitude H2. On the other hand, in response to the second column data with low luminance, the second column pulse T1 may have a low level of amplitude H2. That is, the level of the second column pulse T1 may vary depending on the value of the second column data.

The row signal G may include the first row pulse G11 and the second row pulse G12 that are sequential. The first row pulse G11 may have the first enable timing corresponding to the first column pulse D1 and the second row pulse G12 may have the second enable timing corresponding to the second column pulse T1. Preferably, the first row pulse G11 and the second row pulse G12 are output to have a narrower pulse width than the first column pulse D1 and the second column pulse T1, and are activated during the period in which the first column pulse D1 and the second column pulse T1 are activated.

The backlight board 40 is configured to receive the column signal DT, the row signal G, and the driving voltage VLED. The backlight board 40 is configured to control the light emission of each light emitting block to have luminance corresponding to the column signal DT in response to the row signal G, and to provide a backlight by the light emission of each light emitting block. The driving voltage VLED may be transmitted to the backlight board 40 through the backlight driving board 6 and applied to each light emitting block.

The configuration of the backlight board 40 is described in detail with reference to FIG. 4.

The backlight board 40 may include light emitting blocks and current control integrated circuits. In FIG. 4, the light emitting blocks are indicated by "CH11 to CH93" and the current control integrated circuits are indicated by "T11 to T33".

In the backlight board 40, an area where the light emitting blocks CH11 to CH93 and the current control integrated circuits T11 to T33 are formed may be defined as a backlight area 30. The backlight area 30 can be understood as an area for providing a backlight by light emission of the light emitting blocks CH11 to CH93.

Each light emitting block is a basic unit for controlling dimming. Each light emitting block can be understood as including at least one light emitting diode LED formed in a preset zone on the backlight board 40. That is, the light emitting block can be understood as a light source using an LED.

With the above configuration, the backlight board 40 is configured to serve as a surface light source in which light sources are collected.

In the backlight board 40, the light emitting blocks CH11 to CH93 form columns and rows, and may be arranged in a matrix structure, for example. Each of the light emitting blocks CH11 to CH93 can be understood as including a plurality of LEDs connected in series.

The light emitting blocks CH11 to CH93 may be grouped into a plurality of control units. The control unit may be arranged in the same column or an adjacent column and set to include a plurality of rows, and can be understood as including a predetermined number of light emitting blocks that sequentially emit light according to a horizontal period.

Figure 4:
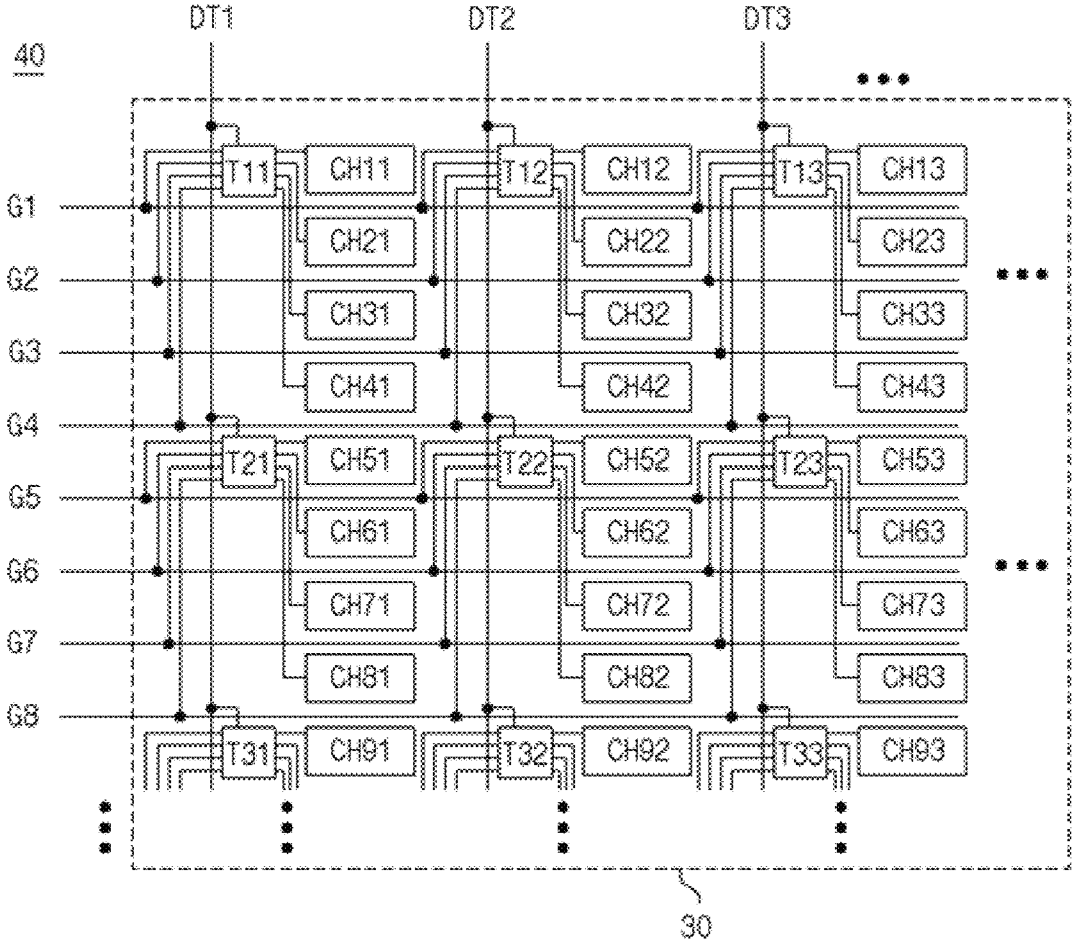
FIG. 4 is a block diagram illustrating a backlight board in FIG. 1.

In the backlight board 40 of FIG. 4, each control unit is illustrated as including light emitting blocks arranged continuously across a plurality of rows on the same column.

More specifically, each control unit may be illustrated as including four light emitting blocks that are consecutively arranged in the same column and emit light sequentially. That is, the light emitting blocks CH11, CH21, CH31, and CH41, the light emitting blocks CH51, CH61, CH71, and CH81, the light emitting blocks CH12, CH22, CH32, and CH42, the light emitting blocks CH52, CH62, CH72, and CH82, the light emitting blocks CH13, CH23, CH33, and CH43, and the light emitting blocks CH53, CH63, CH73, and CH83 may each be grouped into one control unit.

The current control integrated circuits T11, T12, T13, T21, T22, T23, T31, T32, and T33 are each configured to correspond to one control unit.

More specifically, the current control integrated circuit T11 is configured to control driving currents of the light emitting blocks CH11, CH21, CH31, and CH41, the current control integrated circuit T21 is configured to control driving currents of the light emitting blocks CH51, CH61, CH71, and CH81, the current control integrated circuit T12 is configured to control driving currents of the light emitting blocks CH12, CH22, CH32, and CH42, the current control integrated circuit T22 is configured to control driving currents of the light emitting blocks CH52, CH62, CH72, and CH82, the current control integrated circuit T13 is configured to control driving currents of the light emitting blocks CH13, CH23, CH33, and CH43, and the current control integrated circuit T23 is configured to control driving currents of the light emitting blocks CH53, CH63, CH73, and CH83.

The current control integrated circuits T11, T12, T13, T21, T22, T23, T31, T32, and T33 are each configured to receive the column signal DT and the row signal G of the backlight driving board 6. The column signal DT corresponds to the column signals DT1, DT2, DT3 . . . in FIG. 4, and the row signal G corresponds to the row signals G1, G2, G3 . . . in FIG. 4.

The backlight board 40 provides a backlight with a resolution determined by all the light emitting blocks CH11 to CH93. One frame of the backlight corresponds to one frame of an image displayed on the display panel 4 and includes a plurality of horizontal periods. In such a case, the number of horizontal periods included in one frame of the backlight may be different from the number of horizontal periods included in one frame of the image.

The column signals DT1, DT2, DT3 . . . may be provided for every horizontal period. Signal lines to which the column signals DT1, DT2, DT3 . . . are applied may be referred to as column lines.

The row signals G1, G2, G3 . . . may be sequentially provided one by one according to the horizontal period. Signal lines to which the row signals G1, G2, G3 . . . are applied may be referred to as row lines.

With the above configuration, the current control integrated circuits T11, T12, T13, T21, T22, T23, T31, T32, and T33 may each receive the column signal and the row signal of a control unit to which each of the current control integrated circuits T11, T12, T13, T21, T22, T23, T31, T32, and T33 corresponds.

To this end, the current control integrated circuits T11, T21, and T31 are configured to share the column line for receiving the column signal DT1. The current control integrated circuits T12, T22, and T32 are configured to share the column line for receiving the column signal DT2. The current control integrated circuits T31, T23, and T33 are configured to share the column line for receiving the column signal DT3.

Each of the current control integrated circuits T11, T12, T13, T21, T22, T23, T31, T32, and T33 receives row signals corresponding to its control unit. Current control integrated circuits belonging to a control unit of the same row location share row lines and are configured to receive the same row signals.

Each of the current control integrated circuits T11, T12, T13, T21, T22, T23, T31, T32, and T33 may receive the column signal DT and the row signals corresponding to its control unit, control the driving currents of light emitting blocks in the control unit, and as a consequence, control the light emission of the light emitting blocks. For example, the current control integrated circuit T11 may receive the column signal DT1 and the row signals G1 to G4, control the driving currents of the light emitting blocks CH11, CH21, CH31, and CH41, and as a consequence, control the light emission of the light emitting blocks CH11, CH21, CH31, and CH41. The column signal DT1 can be understood as including the first column pulse D1 and the second column pulse T1 that are sequential as illustrated in FIG. 3, and each of the row signals G1 to G4 can be understood as including the first row pulse G11 and the second row pulse G12 that are sequential as illustrated in FIG. 3.

Each of the current control integrated circuits T11, T12, T13, T21, T22, T23, T31, T32, and T33 is configured to generate sampling voltages by sequentially sampling the first column pulse D1 and the second column pulse T1 of the horizontal period-by-horizontal period column signal by using the first row pulse G11 and the second row pulse G12 of the row signals. Subsequently, each of the current control integrated circuits T11, T12, T13, T21, T22, T23, T31, T32, and T33 may control the maintenance of light emission and brightness of the light emitting blocks in the control unit by using the sampling voltages. For example, the current control integrated circuit T11 generates sampling voltages by sampling the first column pulse D1 and the second column pulse T1 of the horizontal period-by-horizontal period column signal DT1 by using the first row pulse G11 and the second row pulse G12 of the row signals G1 to G4 sequentially provided according to the horizontal period, and controls driving currents for light emission of the light emitting blocks CH11, CH21, CH31, and CH41 belonging to the control unit by using the sampling voltages. That is, the current control integrated circuit T11 may control the maintenance of light emission and brightness of the light emitting blocks CH11, CH21, CH31, and CH41.

Figure 5:
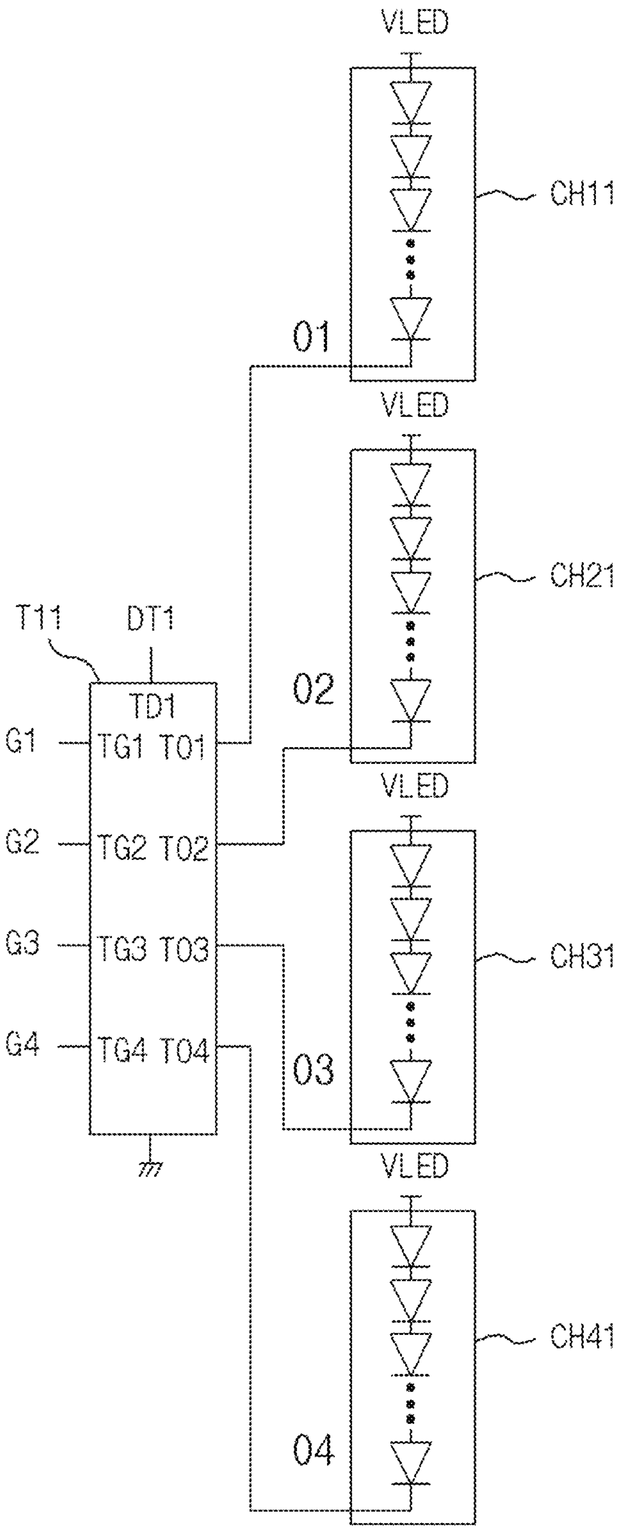
FIG. 5 is a block diagram illustrating the electrical connection relationship between a current control integrated circuit in FIG. 4 and light emitting blocks.

The connection of each of the current control integrated circuits T11, T12, T13, T21, T22, T23, T31, T32, and T33 and light emitting blocks in a corresponding control unit can be understood with reference to FIG. 5. FIG. 5 illustrates the connection of the current control integrated circuit T11 and the light emitting blocks CH11, CH21, CH31, and CH41 in the control unit corresponding to the current control integrated circuit T11.

FIG. 5 illustrates an example in which the current control integrated circuit T11 includes a column input terminal TD1, row input terminals TG1 to TG4, and control terminals T01 to T04. The current control integrated circuit T11 sequentially receives the first column pulse D1 and the second column pulse T1 of the column signal DT1 through the column input terminal TD1, sequentially receives the first row pulse G11 and the second row pulse G12 of each of the row signals G1 to G4 through the row input terminals TG1 to TG4, and receives driving currents 01 to 04 of the light emitting blocks CH11, CH21, CH31, and CH41 through the control terminals T01 to T04.

Each of the light emitting blocks CH11, CH21, CH31, and CH41 receives the driving voltage VLED and includes a plurality of LEDs connected in series. The driving currents 01 to 04 on low sides of the light emitting blocks CH11, CH21, CH31, and CH41 are input to the control terminals T01 to T04 of the current control integrated circuit T11.

Each of the current control integrated circuits T11, T12, T13, T21, T22, T23, T31, T32, and T33 may include buffers BF and driving current control units 101 to 104. The configuration of each of the current control integrated circuits T11, T12, T13, T21, T22, T23, T31, T32, and T33 can be understood with reference to the configuration of the current control integrated circuit T11 in FIG. 6.

The current control integrated circuit T11 includes a buffer BF that receives the column signal DT1 shared with the column line.

The current control integrated circuit T11 may include the driving current control units 101 to 104 that receive the row signals G1 to G4 input through the plurality of rows, respectively, and share the column signal DT1 received through the buffer BF.

The buffer BF may form offset voltages Doffset and Toffset for the first column pulse D1 and the second column pulse T1.

Each of the driving current control units 101 to 104 may be configured to control the amount of driving current for light emission of a light emitting block corresponding to its row signal so as to correspond to the level of the first column pulse D1 and the second column pulse T1 of the column signal DT1. The configuration and operation of the driving current control units 101 to 104 described below are described in detail with reference to FIG. 10.

Figure 7:
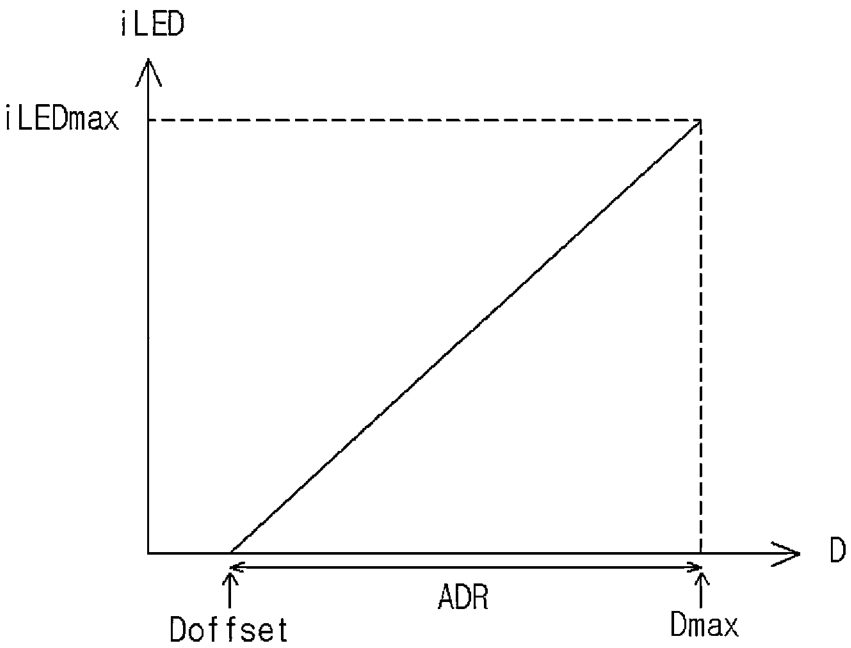
FIG. 7 is a graph illustrating the correlation between the first column signal and a driving current.

An amplitude change, that is, a level change, due to the first column pulse D1 may be described with reference to FIG. 7. FIG. 7 illustrates a change in a driving current iLED according to a change in the level of the first column pulse D1 without considering the second column pulse T1. In FIG. 7, the driving current is indicated by iLED for convenience of description.

In FIG. 7, the offset voltage Doffset can be understood as being formed by the buffer BF that receives the first column pulse D1, and the light emitting block CH11 is extinguished in response to the first column pulse D1 at a level below the offset voltage Doffset.

When the light emission of the light emitting block CH11 is controlled by the first column pulse D1, the light emitting block CH11 may emit light in response to the level of the first column pulse D1 corresponding to a light emission range ADR between a maximum value Dmax and the offset voltage Doffset.

When the level of the first column pulse D1 increases from the offset voltage Doffset to the maximum value Dmax in the light emission range ADR, the amount of driving current iLED of the light emitting block CH11 may be controlled to increase from a minimum value to a maximum value iLEDmax. It can be understood that the luminance of the light emitting block CH11 increases in proportion to the amount of driving current iLED. That is, the level of the first column pulse D1 has a relationship proportional to the amount of the driving current iLED, that is, the luminance of the light emitting block CH11 in the light emission range ADR.

Figure 8:
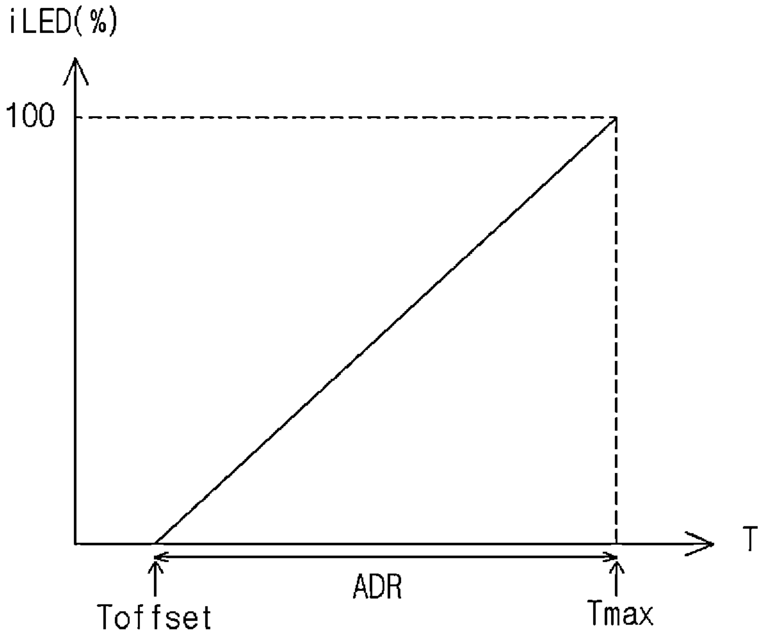
FIG. 8 is a graph illustrating the correlation between the second column signal and a driving current.

In addition, an amplitude change, that is, a level change, in the second column pulse T1 may be described with reference to FIG. 8. FIG. 8 illustrates a change in the driving current iLED according to a pulse width change caused by the level of the second column pulse T1 without considering the first column pulse D1. Also in FIG. 8, the driving current is indicated by iLED for convenience of description.

In FIG. 8, the offset voltage Toffset can be understood as being formed by the buffer BF that receives the second column pulse T1, and the light emitting block CH11 is extinguished in response to the second column pulse T1 at a level below the offset voltage Doffset.

When the light emission of the light emitting block CH11 is controlled by the second column pulse T1, the light emitting block CH11 may emit light in response to the level of the second column pulse T1 corresponding to a light emission range ADR between the maximum value Dmax and the offset voltage Toffset.

When the level of the second column pulse T1 increases from the offset voltage Toffset to the maximum value Tmax in the emission range ADR, the pulse width of a control pulse PWM for controlling the driving current also increases from a minimum value to a maximum value, and correspondingly, the amount of driving current iLED of the light emitting block CH11 may be controlled to increase from the minimum value to the maximum value 100%. That is, the level of the second column pulse T1 and the pulse width of the control pulse PWM controlled by the second column pulse T1 have a relationship proportional to the amount of the driving current iLED, that is, the luminance of the light emitting block CH11 in the light emission range ADR.

Figure 6:
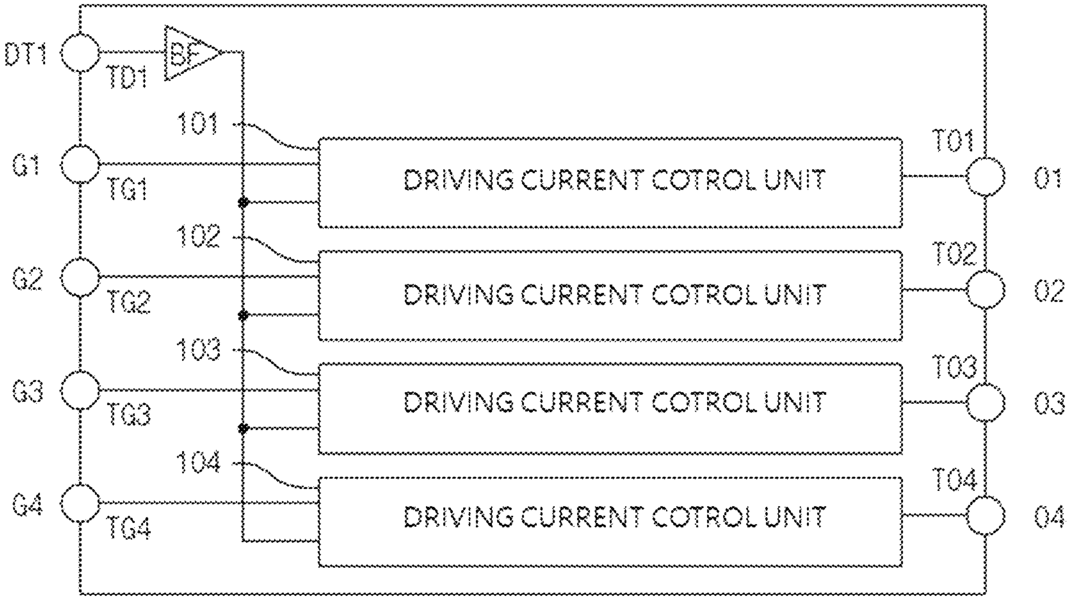
FIG. 6 is a block diagram illustrating an embodiment of the current control integrated circuit in FIG. 4.

In FIG. 6, the driving current control units 101 to 104 are configured to correspond to the light emitting blocks CH11, CH21, CH31, and CH41 of the corresponding control unit thereof.

The driving current control units 101 to 104 may receive the row signals G1 to G4 through the row input terminals TG1 to TG4, respectively, and receive the column signal DT1 through the buffer BF. The driving current control units 101 to 104 may control the amount of driving currents 01 to 04 of the light emitting blocks CH11, CH21, CH31, and CH41 through the control terminals T01 to T04.

More specifically, the driving current control unit 101 may be configured to sequentially receive the first row pulse G11 and the second row pulse G12 of the row signal G1, to generate a sampling voltage by sampling the first column pulse D1 in response to the first row pulse G11, to generate a sampling voltage by sampling the second column pulse T1 in response to the second row pulse G12, and to control the amount of driving current 01 for light emission of the light emitting block CH11 by using the sampling voltages. The driving current control unit 102 may be configured to sequentially receive the first row pulse G11 and the second row pulse G12 of the row signal G2, to generate a sampling voltage by sampling the first column pulse D1 in response to the first row pulse G11, to generate a sampling voltage by sampling the second column pulse T1 in response to the second row pulse G12, and to control the amount of driving current 02 for light emission of the light emitting block CH21 by using the sampling voltages. The driving current control unit 103 may be configured to sequentially receive the first row pulse G11 and the second row pulse G12 of the row signal G3, to generate a sampling voltage by sampling the first column pulse D1 in response to the first row pulse G11, to generate a sampling voltage by sampling the second column pulse T1 in response to the second row pulse G12, and to control the amount of driving current 03 for light emission of the light emitting block CH31 by using the sampling voltages. The driving current control unit 104 may be configured to sequentially receive the first row pulse G11 and the second row pulse G12 of the row signal G4, to generate a sampling voltage by sampling the first column pulse D1 in response to the first row pulse G11, to generate a sampling voltage by sampling the second column pulse T1 in response to the second row pulse G12, and to control the amount of driving current 04 for light emission of the light emitting block CH41 by using the sampling voltages.

Figure 9:
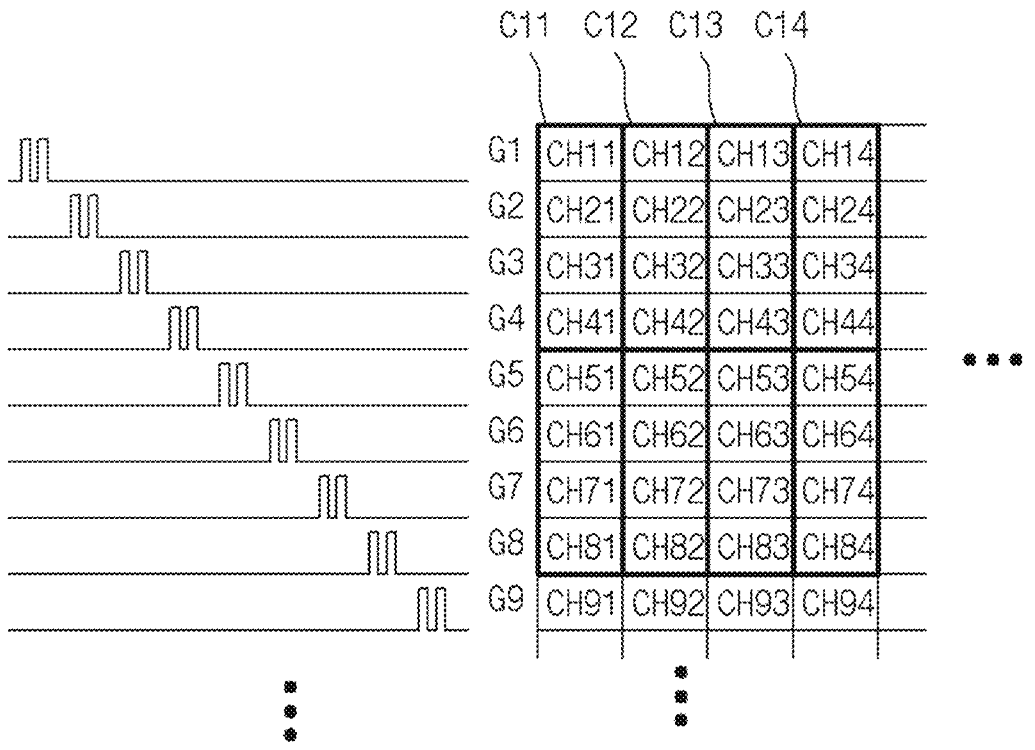
FIG. 9 is a diagram illustrating the arrangement of light emitting blocks and control units.

FIG. 9 illustrates the arrangement of the light emitting blocks and the division of the control units. FIG. 9 illustrates a control unit C11 including the light emitting blocks CH11, CH21, CH31, and CH41, a control unit C12 including the light emitting blocks CH12, CH22, CH32, and CH42, a control unit C13 including the light emitting blocks CH13, CH23, CH33, and CH43, and a control unit C14 including a control unit C14 including the light emitting blocks CH14, CH24, CH34, and CH44.

Figure 10:
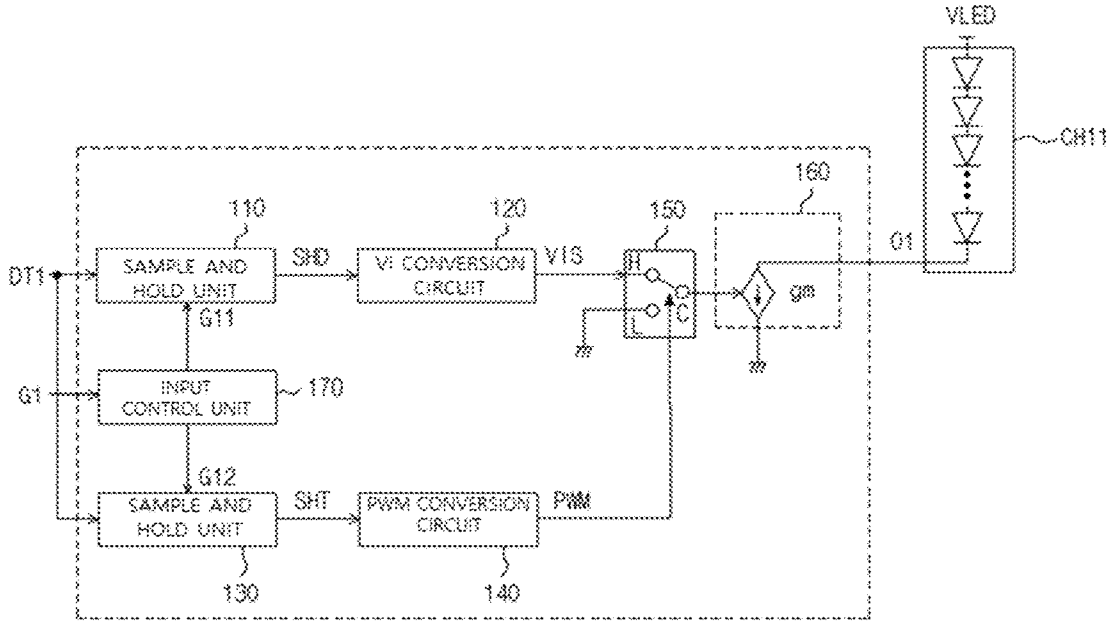
FIG. 10 is a block diagram illustrating an embodiment of a driving current control unit in FIG. 6.

The configurations of the driving current control units 101 to 104 in FIG. 6 may be described in detail with reference to FIG. 10. FIG. 10 illustrates the driving current control unit 101, and the configurations of the remaining driving current control units 102 to 104 can be understood with reference to the driving current control unit 101.

Referring to FIG. 10, the driving current control unit 101 is configured to generate a first sampled signal SHD by sampling the first column pulse D1 in response to the first row pulse G11 and a second sampled signal SHT by sampling the second column pulse T1 in response to the second row pulse G12, to generate a control signal VIS having a current amount corresponding to the first sampled signal SHD and a control pulse PWM corresponding to the second sampled signal SHT, and to control the amount of the driving current 01 by using the control signal VIS transmitted with a current amount controlled by the control pulse PWM.

To this end, the driving current control unit 101 is illustrated as including sample and hold units 110 and 130, an input control unit 170, a voltage current conversion circuit 120, a pulse width conversion circuit 140, a switch 150, and a driver 160. The voltage current conversion circuit 120 is expressed as a VI conversion circuit 120 and the pulse width conversion circuit 140 is expressed as a PWM conversion circuit.

The input control unit 170 is configured to receive the row signal G1, provide, to the sample and hold unit 110, the first row pulse G11 out of the first row pulse G11 and the second row pulse G12 that are sequentially input, and provide the second row pulse G12 to the sample and hold unit 130.

The sample and hold unit 110 may be configured to generate the first sampled signal SHD by sampling the first column pulse D1 of the column signal DT1 in response to the enable timing of the first row pulse G11 of the row signal G1, and output the first sampled signal SHD.

In such a case, the level of the first sampled signal SHD may be formed to correspond to the level of the first column pulse D1. That is, the level of the first sampled signal SHD may be formed to be proportional to the level of the first column pulse D1.

Figure 11:
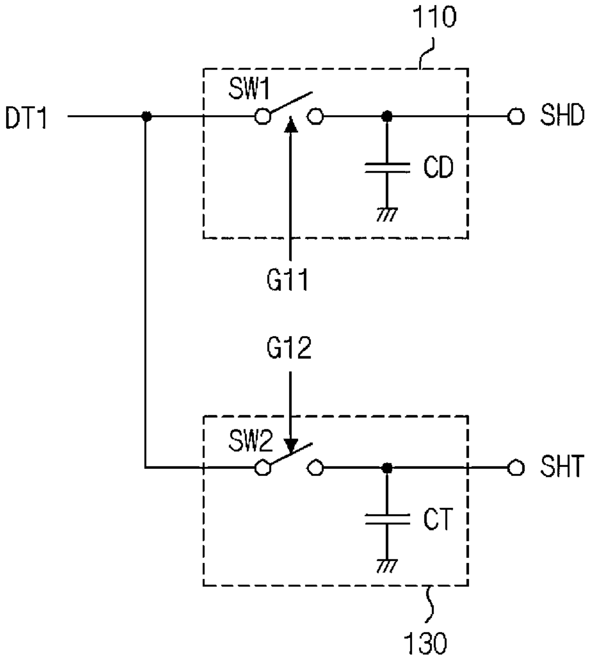
FIG. 11 is a detailed circuit diagram illustrating an embodiment of sample and hold units in FIG. 10.

The sample and hold unit 110 may include a switch SW1 and a capacitor CD as illustrated in FIG. 11. The switch SW1 is configured to switch the output of the first column pulse D1 of the column signal DT1 after its switching is controlled by the first row pulse G11. The capacitor CD is configured in parallel to an output terminal of the switch SW1 and is configured to generate the first sampled signal SHD by sampling the first column pulse D1 output through the switch SW1 and provide the first sampled signal SHD.

The sample and hold unit 130 may be configured to generate the second sampled signal SHT by sampling the second column pulse T1 of the column signal DT1 in response to the enable timing of the second row pulse G12 of the row signal G1, and output the second sampled signal SHT.

The sample and hold unit 130 generates the second sampled signal SHT by sampling the second column pulse T1 while the second row pulse G12 is enabled. In such a case, the level of the second sampled signal SHT may be formed to correspond to the pulse level of the second column pulse T1. That is, the level of the second sampled signal SHT may be formed to be proportional to the pulse level of the second column pulse T1.

The sample and hold unit 130 may include a switch SW2 and a capacitor CT as illustrated in FIG. 11. The switch SW2 is configured to switch the output of the second column pulse T1 of the column signal DT1 after its switching is controlled by the second row pulse G12. The capacitor CT is configured in parallel to an output terminal of the switch SW2 and is configured to generate the second sampled signal SHT by sampling the second column pulse T1 output through the switch SW2 and provide the second sampled signal SHT.

The sample and hold units 110 and 130 may be configured to charge the first column pulse D1 or the second column pulse T1 by using the capacitor, and control the charging time by the first row pulse G11 or the second row pulse G12. The sample and hold unit 110 may be configured to output a charged voltage as the first sampled signal SHD, and the sample and hold unit 130 may be configured to output a charged voltage as the second sampled signal SHT. The sampling of the sample and hold units 110 and 130 may be sequentially performed by the first row pulse G11 and the second row pulse G12 that are dispersed.

The VI conversion circuit 120 may be configured to generate and output the control signal VIS having a current amount corresponding to the voltage level of the first sampled signal SHD. The VI conversion circuit 120 described above may be configured using a dependent current source (not illustrated) that controls an output current by the first sampled signal SHD.

The PWM conversion circuit 140 may be configured to generate and output the control pulse PWM corresponding to the second sampled signal SHT.

Figure 12:
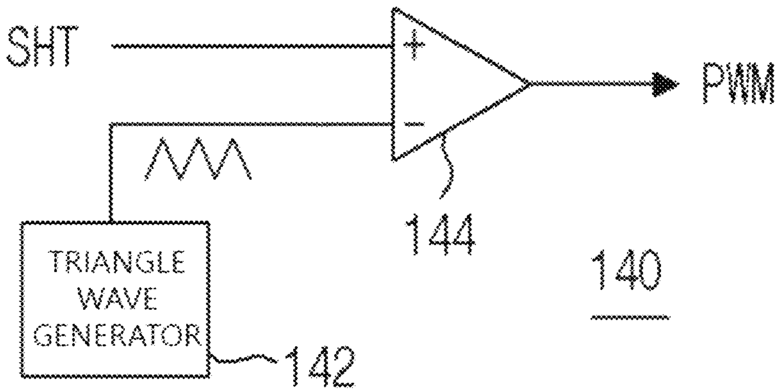
FIG. 12 is a block diagram illustrating an embodiment of a PWM conversion circuit.

The PWM conversion circuit 140 may be configured as illustrated in FIG. 12, for example. Referring to FIG. 12, the PWM conversion circuit 140 may include a triangle wave generator 142 and a comparator 144. The triangle wave generator 142 is used to provide a triangle wave having a preset frequency and amplitude.

The comparator 144 receives the second sampled signal SHT through a positive terminal + and receives the triangle wave of the triangle wave generator 142 through a negative terminal −. With the above configuration, the comparator 144 may compare the triangle wave and the second sampled signal SHT, and output the control pulse PWM having a high-level pulse width for enabling during the period in which the triangle wave has a lower level than the second sampled signal SHT. That is, when a high level of the second sampled signal SHT is formed, the duty ratio, that is, the pulse width, of the control pulse PWM increases, and when a low level of the second sampled signal SHT is formed, the duty ratio, that is, the pulse width, of the control pulse PWM decreases.

The switch 150 is configured to switch transmission of the control signal VIS by the control pulse PWM.

To this end, the switch 150 may include an input terminal H to which the control signal VIS of the VI conversion circuit 120 is input, an input terminal L to which a ground voltage is applied, and an output terminal C for outputting the control signal VIS switched by the control pulse PWM.

The switch 150 connects the input terminal H and the output terminal C during the high-level pulse width duration of the control pulse PWM to output the control signal VIS to the driver 160, and connects the input terminal L and the output terminal C during the low level duration of the control pulse PWM to stop output of the control signal VIS.

That is, the current amount of the control signal VIS provided to the driver 160 through the switch 150 is controlled by the pulse width of the control pulse PWM.

As a consequence, the switch 150 may provide the driver 160 with a positive current corresponding to the result of operating the control signal VIS corresponding to the level of the first column pulse D1 and the control pulse PWM having a pulse width corresponding to the level of the second column pulse T1.

The driver 160 is configured to amplify the amount of a current transmitted through the switch 150 to control the amount of the driving current 01 for light emission of the light emitting block CH11.

To this end, the driver 160 may include a dependent current source gm connected to a low side of the light emitting block CH11, and the dependent current source gm may control the amount of the driving current 01 to be proportional to the current amount of the control signal VIS controlled by the control pulse PWM.

The embodiments of the present disclosure can be operated in one mode among the linear control, the pulse width control, and the composite control, and the above operation may be selected by providing the dimming mode command I2C having a value corresponding to each mode to the microcontroller 10.

In the case of the linear control, in response to the dimming mode command I2C, the microcontroller 10 may provide the digital-to-analog converter 20 with the first column data having a value for the linear control and the second column data having a preset value. In such a case, the digital-to-analog converter 20 may provide, as the column signal DT, the first column pulse D1 having a level for the linear control and the second column pulse T1 having a pre-fixed level such as a high level. Accordingly, the switch 150 of the driving current control unit 101 remains turned on. Therefore, the switch 150 may transmit the control signal VIS of the VI conversion circuit 120 to the driver 160 as is. As a consequence, the driver 160 may control the amount of the driving current 01 for light emission to correspond to the level of the first column pulse D1 of the digital-to-analog converter 20. In the case of the linear control described above, a change in the amount of the driving current 01 for light emission can be understood with reference to FIG. 7.

In the case of the pulse width control, in response to the dimming mode command I2C, the microcontroller 10 may provide the digital-to-analog converter 20 with the first column data having a preset value and the second column data having a value for the pulse width control. In such a case, the digital-to-analog converter 20 may provide, as the column signal DT, the first column pulse D1 having a pre-fixed level such as a high level and the second column pulse T1 having a level for the pulse width control. Accordingly, in the driving current control unit 101, the VI conversion circuit 120 may provide the control signal VIS having a fixed current amount corresponding to the first column pulse D1 at a fixed level, and the switch 150 may switch to transmit the control signal VIS of the VI conversion circuit 120 to the driver 160 by the control pulse PWM having a pulse width corresponding to the second column data. As a consequence, the driver 160 may control the driving current 01 for light emission to correspond to the level of the second column pulse T1 of the digital-to-analog converter 20. In the case of the pulse width control described above, a change in the amount of the driving current 01 for light emission can be understood with reference to FIG. 8.

In the case of the composite control, in response to the dimming mode command I2C, the microcontroller 10 provides the digital-to-analog converter 20 with the first column data and the second column data corresponding to column data of a corresponding horizontal period. In such a case, the digital-to-analog converter 20 may output the first column pulse D1 having a level corresponding to the first column data and the second column pulse T1 having a level corresponding to the second column data. When the luminance of the column data of the corresponding horizontal period is high, the microcontroller 10 may provide the value of the first column data to be equal to or lower than the value of original column data and provide the value of the second column data to be higher than the value of the original column data in order to eliminate the occurrence of a flicker. When the luminance of the column data of the corresponding horizontal period is low, the microcontroller 10 may provide the value of the first column data to be higher than the value of the original column data and provide the value of the second column data to be equal to or lower than the value of the original column data for the purpose of precise dimming control. When the luminance of the column data of the corresponding horizontal period is at a medium level, the microcontroller 10 may provide the first column data and the second column data with the same value as the value of the original column data. As a consequence, the levels of the first column pulse D1 and the second column pulse T1 output from the digital-to-analog converter 20 may be the same as or different from each other for the purpose of dimming control according to luminance.

In the case of the composite control described above, in the driving current control unit 101, the VI conversion circuit 120 provides the control signal VIS having a current amount corresponding to the level of the first column pulse D1, and the PWM conversion circuit 140 provides the control pulse PWM having a pulse width corresponding to the level of the second column pulse T1. The switch 150 switches the control signal VIS with a pulse width corresponding to the duty of the control pulse PWM and transmits a current having an amount corresponding to the switching result to the driver 160. As a consequence, the driver 160 may control the driving current 01 for light emission to correspond to the result of combining the levels of the first column pulse D1 and the second column pulse T1.

According to the above-described embodiments of the present disclosure, light emitting blocks for providing a backlight can maintain light emission for one frame or more, and a backlight with a reduced or eliminated flicker can be provided to an LCD panel for a display.

In addition, the present disclosure groups light emitting blocks for providing a backlight to an LCD panel into a plurality of control units and controls a driving current for dimming control for each light emitting block in the control unit, thereby simplifying the configuration of a backlight device for a display and efficiently controlling dimming.

The present disclosure can also be expected to have the effect that the amount of driving current can be complexly controlled by a level corresponding to the first column pulse and a pulse width corresponding to the second column pulse, which are included in the column signal, so that the luminance of a backlight can be uniformly and precisely controlled in an entire luminance change area.

What is claimed is:

1. A backlight device for a display, comprising:

a backlight driving board configured to generate frame-unit backlight data for a backlight and to provide, for each horizontal period, a column signal comprising a first column pulse and a second column pulse having a level corresponding to column data of the backlight data and a row signal comprising a first row pulse having a first enable timing corresponding to the first column pulse and a second row pulse having a second enable timing corresponding to the second column pulse; and a backlight board configured to provide the backlight by the column signal and the row signal provided for each horizontal period, wherein the backlight board comprises:

light emitting blocks configured to form columns and rows and to be grouped into a plurality of control units each comprising a plurality of rows; and current control integrated circuits configured for each control unit and each comprising a plurality of driving current control units configured to receive the column signal shared by the light emitting blocks of a same column and row signals corresponding to the plurality of rows, respectively, wherein each driving current control unit generates a first sampled signal by sampling the first column pulse by using the first row pulse, generates a second sampled signal by sampling the second column pulse by using the second row pulse, and controls an amount of driving current for light emission of a corresponding light emitting block among the light emitting blocks to correspond to a pulse width corresponding to a level of the first sampled signal and a level of the second sampled signal.

2. The backlight device for a display of claim 1, wherein the backlight driving board receives frame-unit luminance data corresponding to display data, generates the frame-unit backlight data by using the luminance data, generates the first column pulse for linear control and the second column pulse for pulse width control for each horizontal period of the backlight data, generates the first row pulse and the second row pulse for each horizontal period, and provides the column signal comprising the first column pulse and the second column pulse and the row signal comprising the first row pulse and the second row pulse.

3. The backlight device for a display of claim 2, wherein the backlight driving board receives a dimming mode command for defining one of the linear control, the pulse width control, and composite control, and in response to the dimming mode command, the backlight driving board provides the first column pulse to have a level corresponding to luminance of the backlight and provides the second column pulse to have a preset fixed level for the purpose of the linear control, provides the first column pulse to have the preset fixed level and provides the second column pulse to have the level corresponding to the luminance of the backlight for the purpose of the pulse width control, and provides the first column pulse and the second column pulse to have the level corresponding to the luminance of the backlight for the purpose of the composite control.

4. The backlight device for a display of claim 1, wherein the backlight driving board comprises:

a microcontroller configured to receive frame-unit luminance data corresponding to display data, to generate the frame-unit backlight data by using the luminance data, and to output the row signal comprising the horizontal period-by-horizontal period first row pulse and second row pulse of the frame and first column data and second column data corresponding to the horizontal period-by-horizontal period column data of the backlight data; and a digital-to-analog converter configured to sequentially receive the first column data and the second column data, to sequentially generate the first column pulse having a level corresponding to the first column data and the second column pulse having a level corresponding to the second column data, and output the generated first column pulse and second column pulse as the column signal.

5. The backlight device for a display of claim 4, wherein the backlight driving board further comprises a memory, and the microcontroller stores the backlight data for one frame in the memory, reads the backlight data of the memory in units of horizontal periods, and provides the first column data and the second column data.

6. The backlight device for a display of claim 4, wherein the microcontroller receives a dimming mode command for defining one of the linear control, the pulse width control, and composite control, and in response to the dimming mode command, the microcontroller provides the first column data corresponding to the horizontal period-by-horizontal period column data of the backlight data and the second column data having a preset value for the purpose of the linear control, provides the first column data having a preset value and the second column data corresponding to the horizontal period-by-horizontal period column data of the backlight data for the purpose of the pulse width control, and provides the first column data and the second column data corresponding to the horizontal period-by-horizontal period column data of the backlight data for the purpose of the composite control.

7. The backlight device for a display of claim 1, wherein each driving current control unit generates the first sampled signal by sampling the first column pulse by using the first row pulse and the second sampled signal by sampling the second column pulse by using the second row pulse, generates a control signal having a current amount at a level corresponding to the first sampled signal and a control pulse having a pulse width corresponding to the second sampled signal, and controls the amount of the driving current by using the control signal having the current amount controlled by the control pulse.

8. The backlight device for a display of claim 1, wherein each driving current control unit comprises:

a first sample and hold unit configured to generate the first sampled signal by sampling the first column pulse by using the first row pulse;

a second sample and hold unit configured to generate the second sampled signal by sampling the second column pulse by using the second row pulse;

an input control unit configured to receive the row signal, to provide the first sample and hold unit with the first row pulse out of the first row pulse and the second row pulse that are sequentially input, and to provide the second row pulse to the second sample and hold unit;

a voltage current conversion circuit configured to generate a control signal having a current amount corresponding to the level of the first sampled signal;

a PWM conversion circuit configured to generate a control pulse having the pulse width corresponding to the level of the second sampled signal;

a switch configured to switch transmission of the control signal by the control pulse; and a driver configured to control the amount of the driving current for light emission of the corresponding light emitting block among the light emitting blocks by the control signal transmitted through the switch.

9. The backlight device for a display of claim 8, wherein the driver comprises a dependent current source connected to a low side of the corresponding light emitting block among the light emitting blocks, and the dependent current source controls the amount of the driving current to be proportional to a current amount of the control signal controlled by the control pulse.

10. A current control integrated circuit of a backlight device for a display, comprising:

a plurality of driving current control units configured to correspond to light emitting blocks in control units each comprising a plurality of rows, to share a column signal comprising a first column pulse and a second column pulse with respect to a same column, and to receive different row signals each comprising a first row pulse and a second row pulse, wherein each of the driving current control units generates a first sampled signal by sampling the first column pulse by using the first row pulse having a first enable timing corresponding to the first column pulse, generates a second sampled signal by sampling the second column pulse by using the second row pulse having a second enable timing corresponding to the second column pulse, and controls an amount of driving current for light emission of a corresponding light emitting block among the light emitting blocks to correspond to a pulse width corresponding to a level of the first sampled signal and a level of the second sampled signal.

11. The current control integrated circuit of a backlight device for a display of claim 10, wherein each driving current control unit generates the first sampled signal by sampling the first column pulse by using the first row pulse and the second sampled signal by sampling the second column pulse by using the second row pulse, generates a control signal having a current amount at a level corresponding to the first sampled signal and a control pulse having a pulse width corresponding to the second sampled signal, and controls the amount of the driving current by using the control signal having the current amount controlled by the control pulse.

12. The current control integrated circuit of a backlight device for a display of claim 10, wherein each driving current control unit comprises:

a first sample and hold unit configured to generate the first sampled signal by sampling the first column pulse by using the first row pulse;

a second sample and hold unit configured to generate the second sampled signal by sampling the second column pulse by using the second row pulse;

an input control unit configured to receive the row signal, to provide the first sample and hold unit with the first row pulse out of the first row pulse and the second row pulse that are sequentially input, and to provide the second row pulse to the second sample and hold unit;

a voltage current conversion circuit configured to generate a control signal having a current amount corresponding to the level of the first sampled signal;

a PWM conversion circuit configured to generate a control pulse having the pulse width corresponding to the level of the second sampled signal;

a switch configured to switch transmission of the control signal by the control pulse; and a driver configured to control the amount of the driving current for light emission of the corresponding light emitting block among the light emitting blocks by the control signal transmitted through the switch.

13. The current control integrated circuit of a backlight device for a display of claim 12, wherein the driver comprises a dependent current source connected to a low side of the corresponding light emitting block among the light emitting blocks, and the dependent current source controls the amount of the driving current to be proportional to a current amount of the control signal transmitted through the switch.

* * * * *